United States Patent
Tao et al.

(10) Patent No.: US 7,035,037 B2
(45) Date of Patent: Apr. 25, 2006

(54) DISC DRIVE WITH COMPENSATION FOR NON-REPEATABLE RUNOUT

(75) Inventors: Zhang Tao, Shakopee, MN (US); John Christopher Morris, Minneapolis, MN (US); Priyadarshee Deeptarag Mathur, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 301 days.

(21) Appl. No.: 10/306,393

(22) Filed: Nov. 27, 2002

(65) Prior Publication Data

US 2003/0231422 A1 Dec. 18, 2003

Related U.S. Application Data

(60) Provisional application No. 60/389,579, filed on Jun. 18, 2002.

(51) Int. Cl.
*G11B 5/596* (2006.01)
(52) U.S. Cl. .............. 360/77.02; 360/77.04; 360/78.04
(58) Field of Classification Search ........... 360/77.02, 360/77.04
See application file for complete search history.

(56) References Cited

U.S. PATENT DOCUMENTS

| | | | |
|---|---|---|---|
| 5,072,318 A * | 12/1991 | Yu | 360/77.02 |
| 5,099,367 A | 3/1992 | Sidman | 360/77.05 |
| 5,155,422 A * | 10/1992 | Sidman et al. | 318/560 |
| 5,220,468 A | 6/1993 | Sidman | 360/77.05 |
| 5,369,345 A | 11/1994 | Phan et al. | 318/561 |
| 5,646,797 A | 7/1997 | Kadlec et al. | 360/75 |
| 5,828,515 A | 10/1998 | Kim | 360/78.06 |
| 5,909,661 A * | 6/1999 | Abramovitch et al. | 702/191 |
| 6,246,536 B1 | 6/2001 | Galloway | 360/78.04 |
| 6,404,581 B1* | 6/2002 | Shah | 360/75 |
| 6,618,219 B1* | 9/2003 | Ho | 360/77.04 |
| 6,684,114 B1* | 1/2004 | Erickson et al. | 700/45 |
| 2002/0012191 A1 | 1/2002 | Ho et al. | 360/77.04 |
| 2002/0093754 A1 | 7/2002 | Zhang et al. | 360/77.04 |

OTHER PUBLICATIONS

Microsoft Press Computer Dictionary, 3rd Edition p. 399-400.*
IEEE Standard Dictionary of Electrical and Electronics Terms, 6th Edition, p. 885.*

* cited by examiner

*Primary Examiner*—K. Wong
(74) *Attorney, Agent, or Firm*—Westman, Champlin & Kelly

(57) ABSTRACT

An NRRO compensation circuit controls a head position in a disc drive. The circuit has a first frequency circuit providing a first output corresponding to NRRO and a first characteristic sensing circuit that senses the first output and that generates a first control output that adjusts a first NRRO compensation gain. A first control circuit included in the NRRO compensation circuit receives the first control output and the first NRRO compensation gain and provides a first NRRO compensator output.

28 Claims, 12 Drawing Sheets

DISC DRIVE WITH COMPENSATION FOR NON-REPEATABLE RUNOUT

CROSS-REFERENCE TO RELATED APPLICATION

This application claims priority from U.S. Provisional Application 60/389,579 filed on Jun. 18, 2002 for inventors Tao Zhang, John Christopher Morris and Priyadarshee Deeptarag Mathur, entitled "Self-tuning non-repeatable runout compensation in disc drives" and identified as.

FIELD OF THE INVENTION

The present invention relates generally to disc drives, and more particularly but not by limitation to reducing non-repeatable runout error.

BACKGROUND OF THE INVENTION

At very high tracks per inch (TPI) in disc drives, non-repeatable runout (NRRO) becomes a major issue to achieve high performance tracking. NRRO comes from many sources such as electronic noises, disc flutter, spindle motor, arm/suspension modes, media defects, external vibrations, etc. Some of the sources have relatively high energy at certain narrow frequency bands (e.g., disc flutter and actuator resonance modes). There can be components of NRRO in several frequency ranges. At some outside diameter (OD) tracks, the sum of the NRRO energy at these multiple frequency ranges can comprise a significant portion of total NRRO energy. This may result in a long settling time at the end of seeking, increased write unsafe number, and large track following PES.

There is a desire to reduce disc drive NRRO in one or more narrow frequency bands without incurring the cost of increasing runout at other frequencies.

SUMMARY OF THE INVENTION

Disclosed is an NRRO compensation circuit that controls a head position in a disc drive.

A runout input that includes a characteristic of non-repeatable runout (NRRO) is coupled to a control circuit. The control circuit receives the runout input and provides a first NRRO compensator output responsive to the runout input. The control circuit has a first NRRO compensation gain adjusted as a function of the characteristic.

These and other features and benefits that characterize embodiments of the present invention will be apparent upon reading the following detailed description and review of the associated drawings.

DETAILED DESCRIPTION OF ILLUSTRATIVE EMBODIMENTS

A self-tuning compensation circuit addresses the non-repeatable runout (NRRO) in disc drives. A self-tuning algorithm has the capability of detecting the amplitude of NRRO, and adjusting the attenuation or gain of the compensator in real-time based on the NRRO distribution. In one preferred arrangement, NRRO is detected in the position error signal (PES) using a filter F, and then an automatic tuning algorithm adjusts the NRRO compensation gain such that the NRRO is attenuated in a desired frequency range. When there is little NRRO energy located at this frequency, the self-tuning function will gradually remove the NRRO compensator to keep the servo loop as usual, avoiding the water-bed effect. Embodiments of such circuits are described below in connection with examples shown in FIGS. 1–10.

Figure 1:
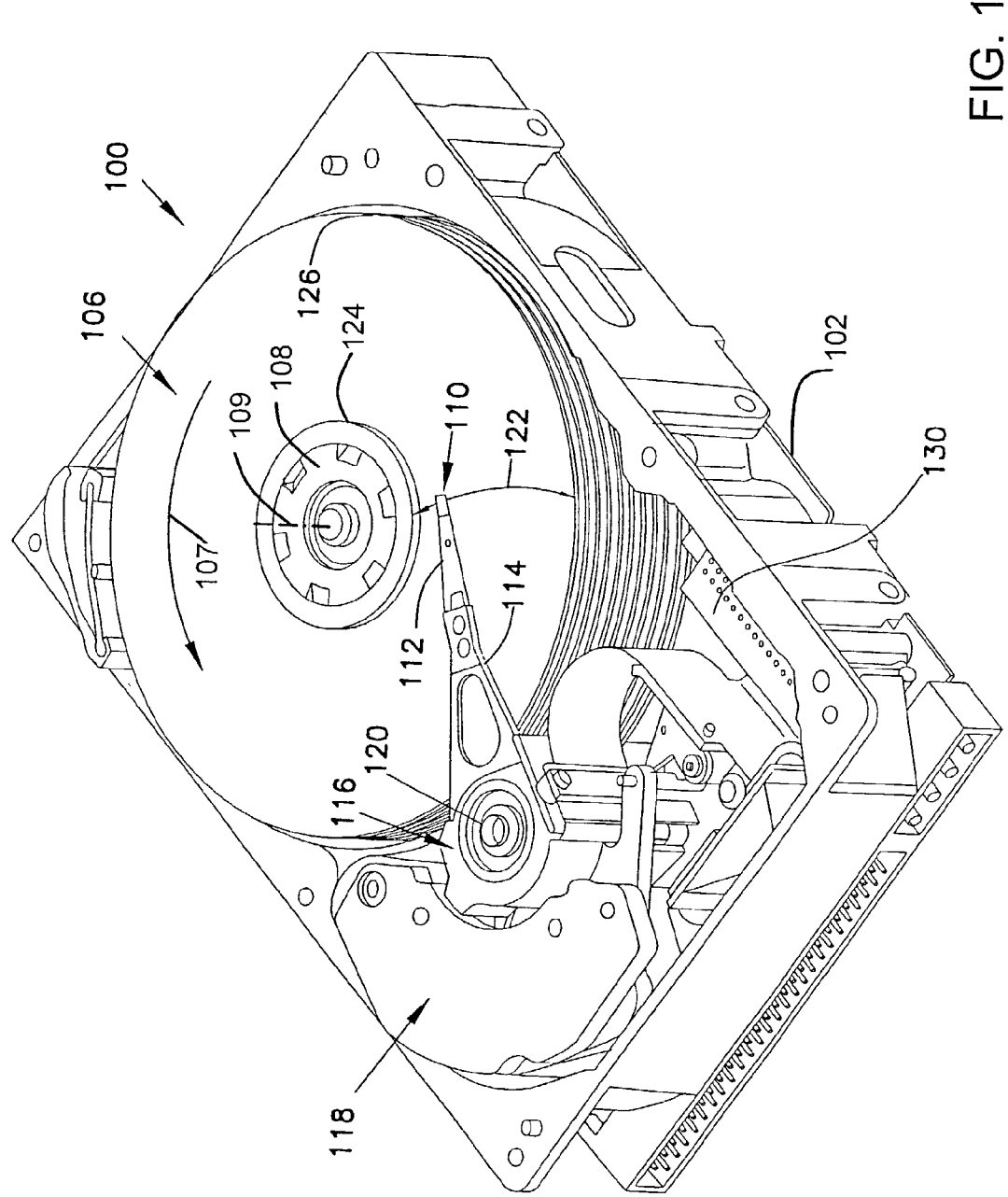
FIG. 1 is an oblique view of a disc drive.

FIG. 1 is an oblique view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation in a direction indicated by arrow 107 about a central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type called a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown). As explained in more detail below in connection with examples illustrated in FIGS. 2–10, the servo electronics 130 includes one or more self-tuning NRRO compensation circuits.

As the number of tracks per inch (TPI) increase, non-repeatable runout (NRRO) becomes a major issue to achieve a high performance tracking. NRRO comes from many sources such as electronic noises, disc flutter, spindle motor, arm/suspension modes, media defects, external vibrations, etc. Some of them have relatively high energy at certain narrow frequency bands (e.g., disc flutter and actuator resonance modes). For example, in one disc drives with four discs, a large amount NRRO is observed at 970 Hz, 1280 Hz, 1785 Hz and 2000 Hz ranges. At some outside diameter (OD) tracks, the sum of the NRRO energy at these four frequency ranges can reach 20–30% of total NRRO energy. This can result in a long settling time at the end of seeking, increased write unsafe number, and large track following PES.

Figure 2A:
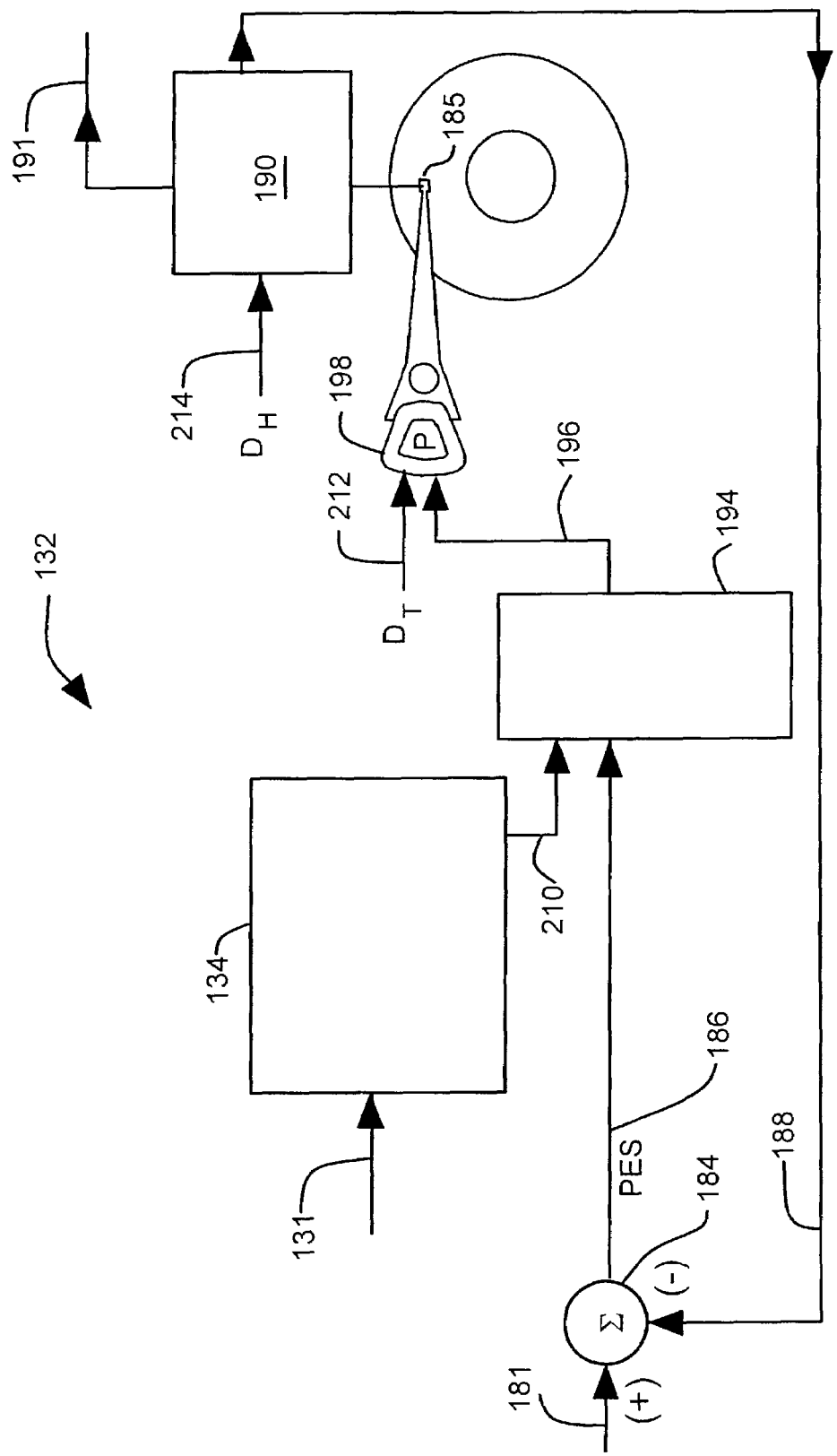
FIG. 2A schematically illustrates a first embodiment of a disc drive circuit that includes an NRRO compensation circuit.

FIG. 2A schematically illustrates a first embodiment of a disc drive circuit 132 that includes an NRRO compensation circuit 134. The disc drive circuit 132 controls a position of a head 185 in the disc drive.

The disc drive circuit 132 includes a summing junction 184 that provides a position error signal (PES) 186. A head interface circuit 190 provides a feedback output 188 that provides an indication of head position to the summing junction 184. The head interface circuit 190 also is connected to a data bus 191 for communicating data between the head 185 and a host system (not illustrated). The host system, such as a computer (not illustrated) provides a desired reference position 181 for the head 185. A controller 194 receives the position error signal 186 and provides a head position control output 196. The head position control output 196 is preferably a current driving a voice coil motor 198 to position the head 185. The controller 194 preferably controls the head position control output 196 as a function of a sum of the position error signal 186 and a first NRRO compensator output 210.

$D_T$ at 212 represents the non-repeatable torque disturbances contributing to NRRO such as windage, rotational vibration, resonance mode effect, etc. $D_H$ at 214 denotes the head disturbances including measurement noises, disc flutter, eccentricity, etc.

A runout input 131 includes a characteristic of non-repeatable runout (NRRO). The runout input 131 can be received from a device such as an accelerometer mounted on the disc drive or from the position error signal 186.

The NRRO compensation circuit 134 receives the runout input 131 and provides the first NRRO compensator output 210 responsive to the runout input 131. The control circuit 134 has a first NRRO compensation gain adjusted as a function of the characteristic in the runout input 131. The NRRO compensator output 210 couples to the controller 194. The circuit 134 of FIG. 2A is explained in more detail below in connection with an example illustrated in FIG. 2B.

Figure 2B:
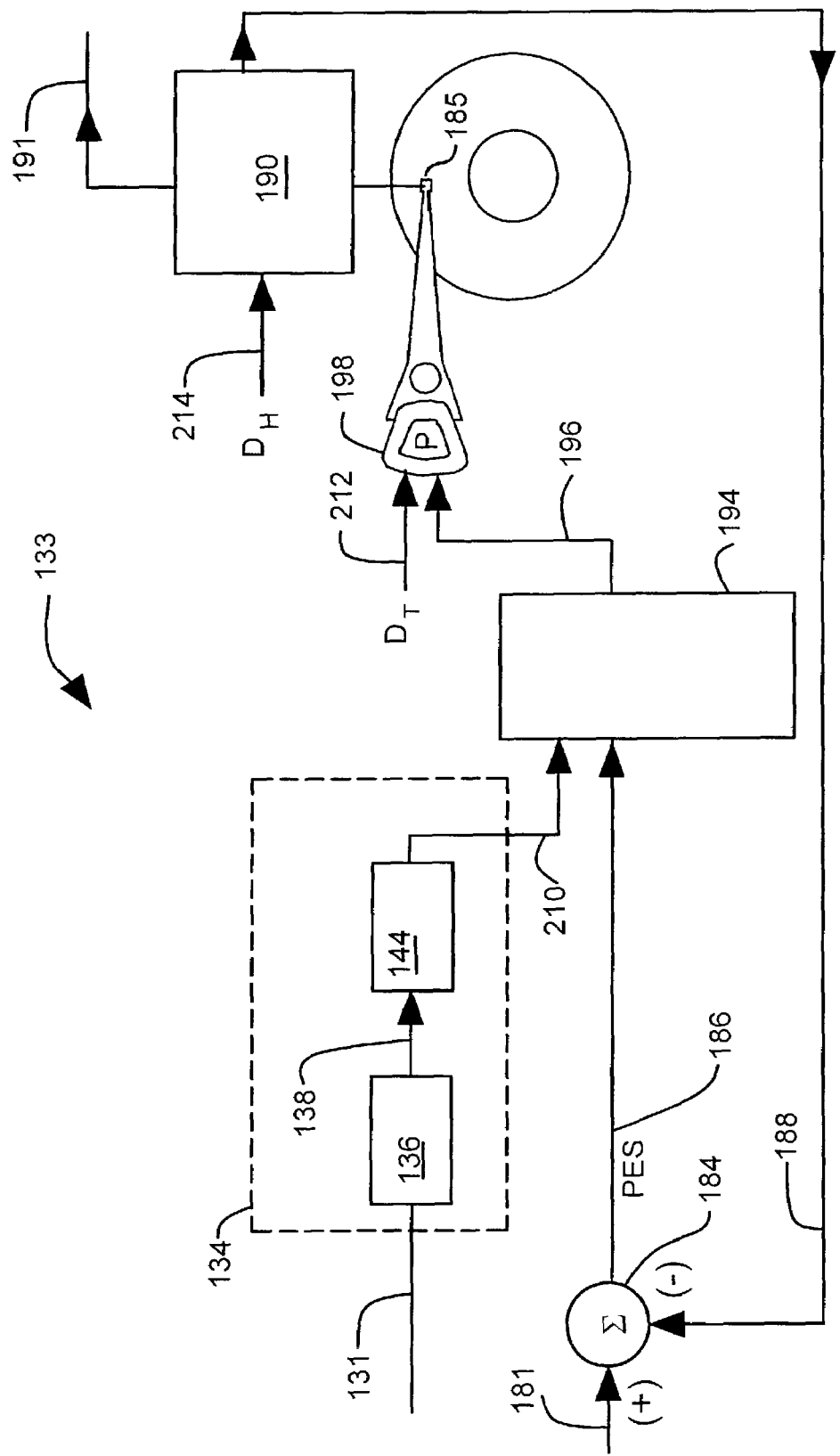
FIG. 2B schematically illustrates a second embodiment of a disc drive circuit that includes an NRRO compensation circuit.

FIG. 2B schematically illustrates a second embodiment of a disc drive circuit 133 that includes an NRRO compensation circuit 134. In FIG. 2B, reference numbers that are the same as reference numbers used in FIG. 2A identify the same or similar features.

In FIG. 2B, the NRRO compensation circuit 134 includes a first frequency circuit 136 that provides a first output 138 corresponding to NRRO. The first output 138 provides an indication of a frequency at which NRRO noise is currently occurring. The first frequency circuit 136 can obtain NRRO noise data by a connection to the position error signal 186, by connection to an accelerometer sensing environmental vibration or from another source of real time NRRO noise data. The first frequency circuit 136 can include a filter, a peak detector or another means of separating NRRO noise from other signal components in real time.

The NRRO compensation circuit 134 in FIG. 2B also includes a first control circuit 144 that receives the first control output 138 and that provides the first NRRO compensator output 210. The first control circuit 144 can be an amplifier with adjustable gain, an attenuator with adjustable attenuation or another circuit that can provide adjustment when there is NRRO present in a selected frequency range. The first frequency circuit 136 selectively provides the NRRO noise at the first output 138. When the noise is above the threshold level, the gain of the first control circuit 144 is adjusted accordingly. The circuit 134 of FIG. 2B is explained in more detail below in connection with an example illustrated in FIG. 2C.

Figure 2C:
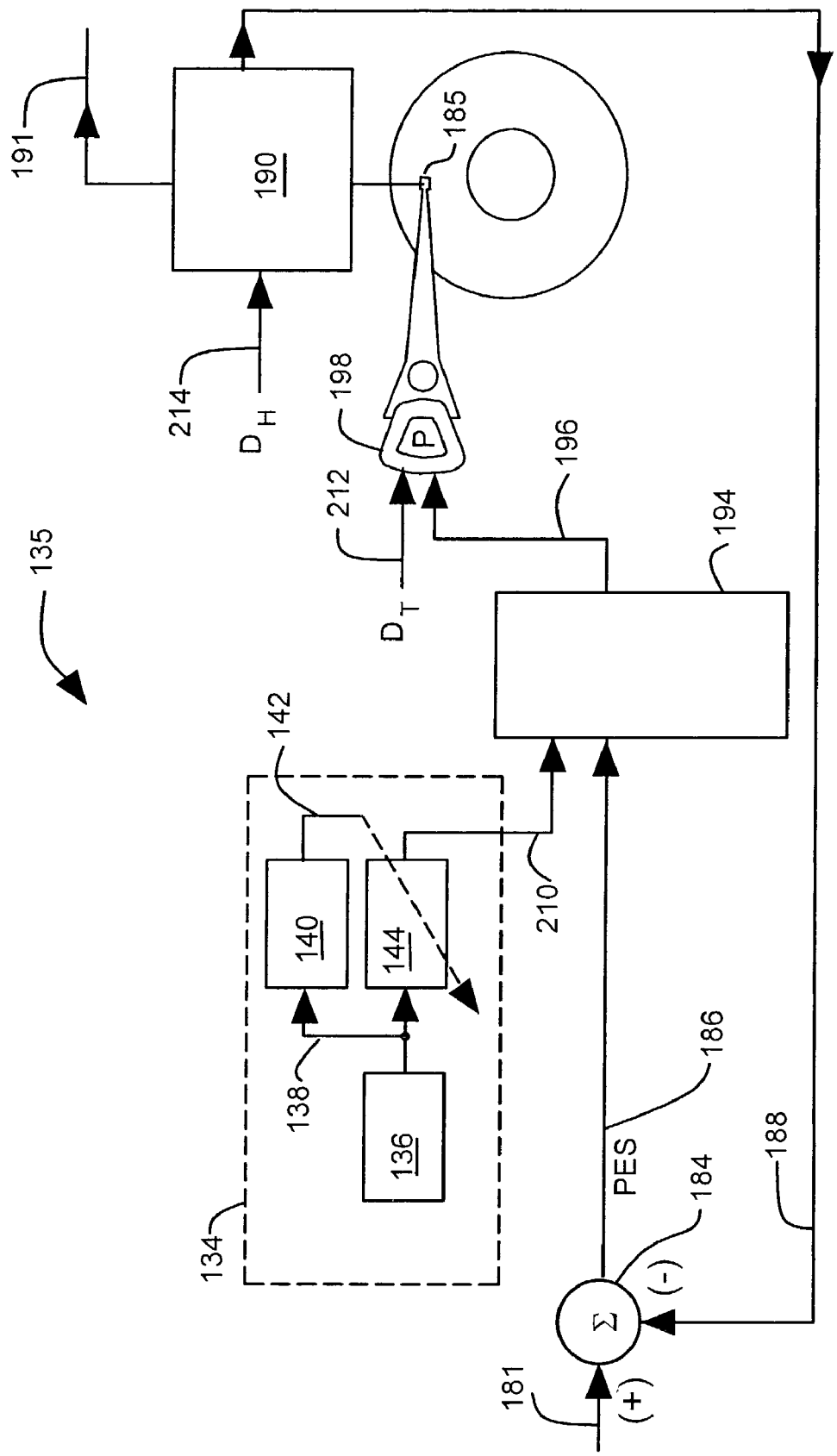
FIG. 2C schematically illustrates a third embodiment of a disc drive circuit that includes an NRRO compensation circuit.

FIG. 2C schematically illustrates a third embodiment of a disc drive circuit 135 that includes an NRRO compensation circuit 134. In FIG. 2C, reference numbers that are the same as reference numbers used in FIGS. 2A, 2B identify the same or similar features.

The NRRO compensation circuit 134 in FIG. 2C includes a first frequency circuit 136 that provides a first output 138 corresponding to NRRO. The first output 138 provides an indication of a frequency at which NRRO noise is currently occurring. The first frequency circuit 136 can obtain NRRO noise data by a connection to the position error signal 186, by connection to an accelerometer sensing environmental vibration or from another source of real time NRRO noise data. The first frequency circuit 136 can include a filter, a peak detector or another means of separating NRRO noise from other signal components in real time.

The NRRO compensation circuit 134 includes a first characteristic sensing circuit 140 that senses the first output 138 and that generates a first control output 142 that adjusts a first NRRO compensation gain. The first characteristic sensing circuit 140 can sense amplitude, power, duration or other characteristics to ascertain whether NRRO noise is above a selected threshold level where NRRO compensation is desired.

The NRRO compensation circuit 134 also includes a first control circuit 144 that receives the first control output 138 and the first output and that provides the first NRRO compensator output 210. The first control circuit 144 can be an amplifier with adjustable gain, an attenuator with adjustable attenuation or another circuit that can provide adjustment when there is NRRO present in a selected frequency range. The first frequency circuit 136 selectively provides the NRRO noise at the first output 138. The first characteristic sensing circuit 140 adjusts the first control output 142 based on whether the noise is above a selected threshold level. When the noise is above the threshold level, the gain of the first control circuit 144 is adjusted by the first control output 142.

Figure 3:
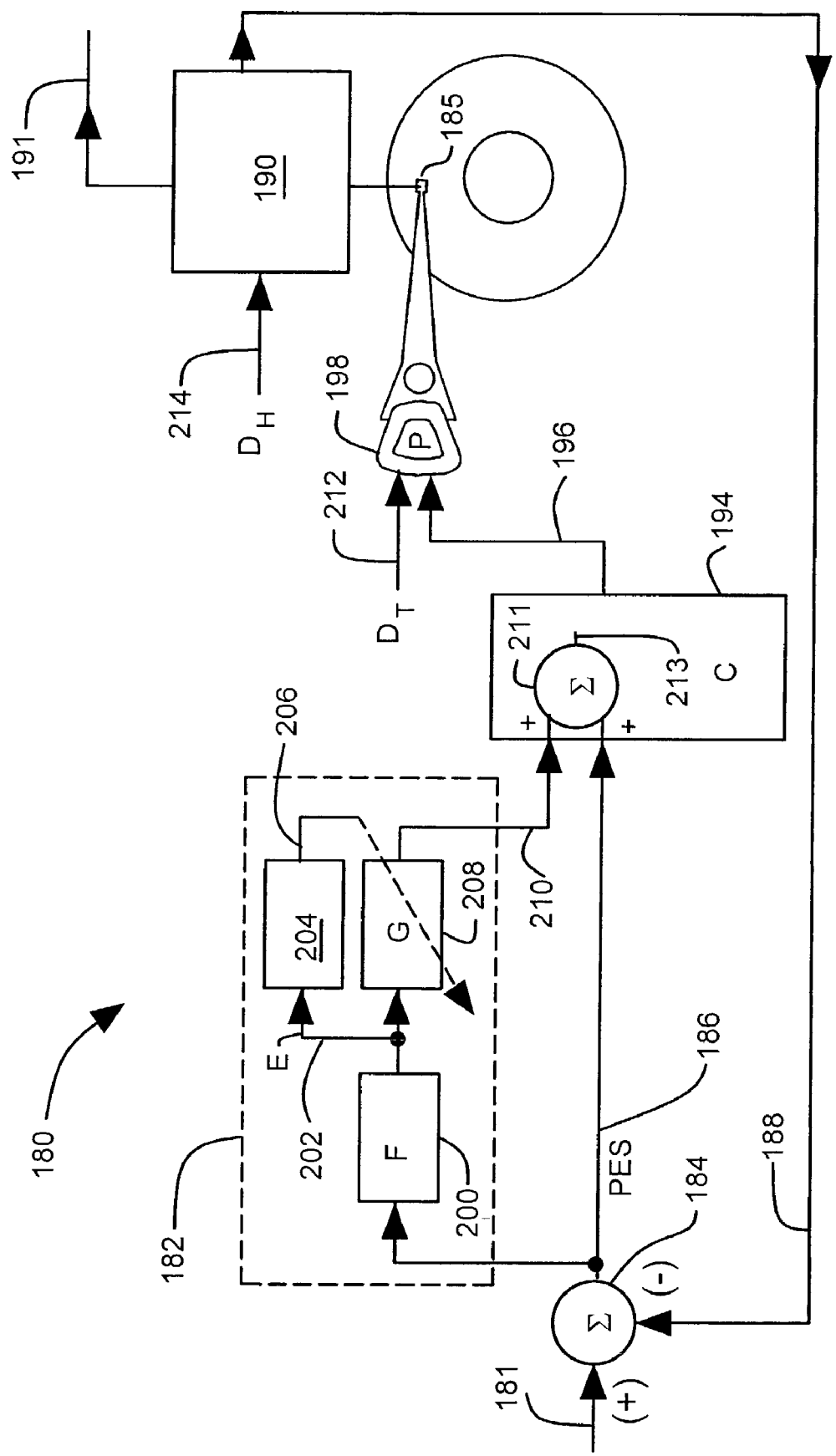
FIG. 3 schematically illustrates a fourth embodiment of a disc drive circuit that includes an NRRO compensation circuit.

FIG. 3 schematically illustrates a fourth embodiment of a disc drive circuit 180 that includes a self-tuning NRRO compensation circuit 182. The disc drive circuit 180 comprises a servo circuit that controls a position of a read/write head 185.

The disc drive circuit 180 in FIG. 3 is similar to the disc drive circuit 132 in FIG. 2C and reference numbers used in FIG. 3 that are the same as reference numbers used in FIG. 2C identify the same or similar features. In FIG. 3, the position error signal 186 and the first NRRO compensator output 210 are summed at a summing junction 211, also called a summing node 211, in the controller 194. The controller 194 controls based on the output 213 of the summing node 211 rather than on the position error signal 186 alone.

A first bandpass filter 200, also called a first NRRO detector 200, (comparable to the first frequency circuit 136 in FIG. 2C) receives the position error signal 186 and providing a first filter output E at 202 that selectively reproduces a first portion of the position error signal 186 in a first preselected frequency band that corresponds with a first NRRO frequency peak. The first bandpass filter 200 detects the energy of the noise due to NRRO within a certain frequency range defined by the pass band of the first bandpass filter 200. The first bandpass filter 200 preferably comprises a second order filter, and is discussed in more detail below in connection with an example illustrated FIG. 5.

A first amplitude sensing circuit 204 (comparable to the first characteristic sensing circuit 140 in FIG. 2C) receives the first filter output 202 and provides a first gain control output 206. In one preferred embodiment, the amplitude sensing circuit 204 includes an envelope detector that senses an amplitude of an envelope of the first filter output 202. A first gain control circuit 208 (comparable to the first control circuit 144 in FIG. 2C) receives the first filter output 202 and also receives the first gain control output 206. The first gain control circuit 208 provides the first NRRO compensator output 210 to the controller 194. The first NRRO compensator output 210 reproduces the first filter output 202 multiplied by a gain G that is adjusted or set by the first gain control output 206. Gain G is a time-varying gain being adjusted by first amplitude sensing circuit 204. In one preferred arrangement, the first gain control circuit 208 comprises a multiplier.

In the arrangement shown in FIG. 3 the voice coil motor 198 is considered a plant P to be servo controlled by the controller C at 194. The position error signal (PES) 186 is the error between the sensed head position 188 and the reference signal 181. The first amplitude sensing circuit 204 automatically tunes the first gain control output 206 to increase the gain G when the first filter output 202 increases, and to decrease the gain G when the first filter output 202 decreases.

In a preferred arrangement, the first amplitude sensing circuit 204 includes a recursive algorithm that tunes the first gain control output 206 in real time during normal disc drive operation. The recursive algorithm, for example, can be a function of $$g(t) = \begin{cases} \alpha^* g(t-1) + \beta^*(|e| - e_0), & \text{when } |e| > e_0 \\ \alpha^* g(t-1), & \text{when } |e| \le e_0 \end{cases} \quad \text{Equation 1}$$

where t is a number of a time increment, g is the gain, α (alpha) has a value between 0 and 1, β (beta) is a tuning rate greater than 0, e is the first filter output and $e_0$ is a selected level of e for turning the automatic tuning on and off.

The recursive algorithm in Equation 1 has an initial condition value g(0) at the start of a seek operation, and the initial condition value g(0) is preferably adjusted as a function of track number. The initial value g(0) can be set based on the available information of the NRRO location and amplitude. For example, if the NRRO at a OD track has a very large disc flutter mode, g(0)=1 can be chosen to reduce the transient of the NRRO cancellation. If there is no such kind of information, it can be simply set to zero.

The self-tuning algorithm (Equation 1) has the following properties:

1. For g(0)=0 (i.e., no NRRO control action is used), when a large NRRO signal |e|>$e_0$ is detected, the gain g(t) increases. The NRRO compensator will be gradually added in the servo loop.

2. As time goes on, when g(t) reaches a value that equals to $$\frac{\beta(|e| - e_0)}{1 - \alpha} \quad \text{Equation 2}$$

it will stop increasing. This implies that g(t) is bounded for α<1, and the upper bound can be adjusted by the design parameters α and β.

3. When the NRRO is small (|e|≦$e_0$), the self-tuning law becomes g(t)=α* g(t-1). Since α<1, the gain g(t) will gradually decrease to zero, this NRRO compensator can be removed from the servo loop automatically.

As an example, a disc drive is found to have a mechanical resonance, also called a frequency peak, near 1280 Hz that can be non-repeatably excited by some actuations of the voice coil motor 198 or by some mechanical vibrations coupled in from the disc drive mounting environment. The mechanical resonance causes non-repeatable runout error (NRRO). In this example, the filter 200 has a pass band with a fixed center frequency at 1280 Hz to correspond with the observed frequency peak of the non-repeatable runout error. When there is a low amplitude E at the output of the filter 200, then the amplitude sensing circuit 204 senses this low amplitude and provides a lower level of the gain G, effectively shutting off the NRRO compensation at 1280 HZ when there are low levels of NRRO at 1280 Hz. When there is a high amplitude E at the output of filter 200, however, the amplitude sensing circuit 204 senses this high amplitude and provides a higher level of the gain G, effectively turning on the NRRO compensation at 1280 Hz when there are high levels of NRRO at 1280 HZ. The "self-tuning" characteristic of the self-tuning NRRO compensation circuit 182 is not a frequency-tuning characteristic, but is a gain-tuning characteristic. The gain-tuning characteristic adjusts the amount of compensation for NRRO at a particular frequency based on real time measurement by the first amplitude sensing circuit 204 of the amount of NRRO present in the position error signal 186. The positioning of the head 185 is optimized for conditions ranging from no NRRO noise at 1280 Hz to high levels of noise at 1280 HZ. This technique can be applied to a frequency other than 1280 and can also be applied to multiple frequencies as explained in more detail below in connection with FIG. 4.

The circuit 182 can be realized using hardware, firmware, software, analog or digital circuits, standard or custom integrated circuits or combinations thereof.

Figure 4:
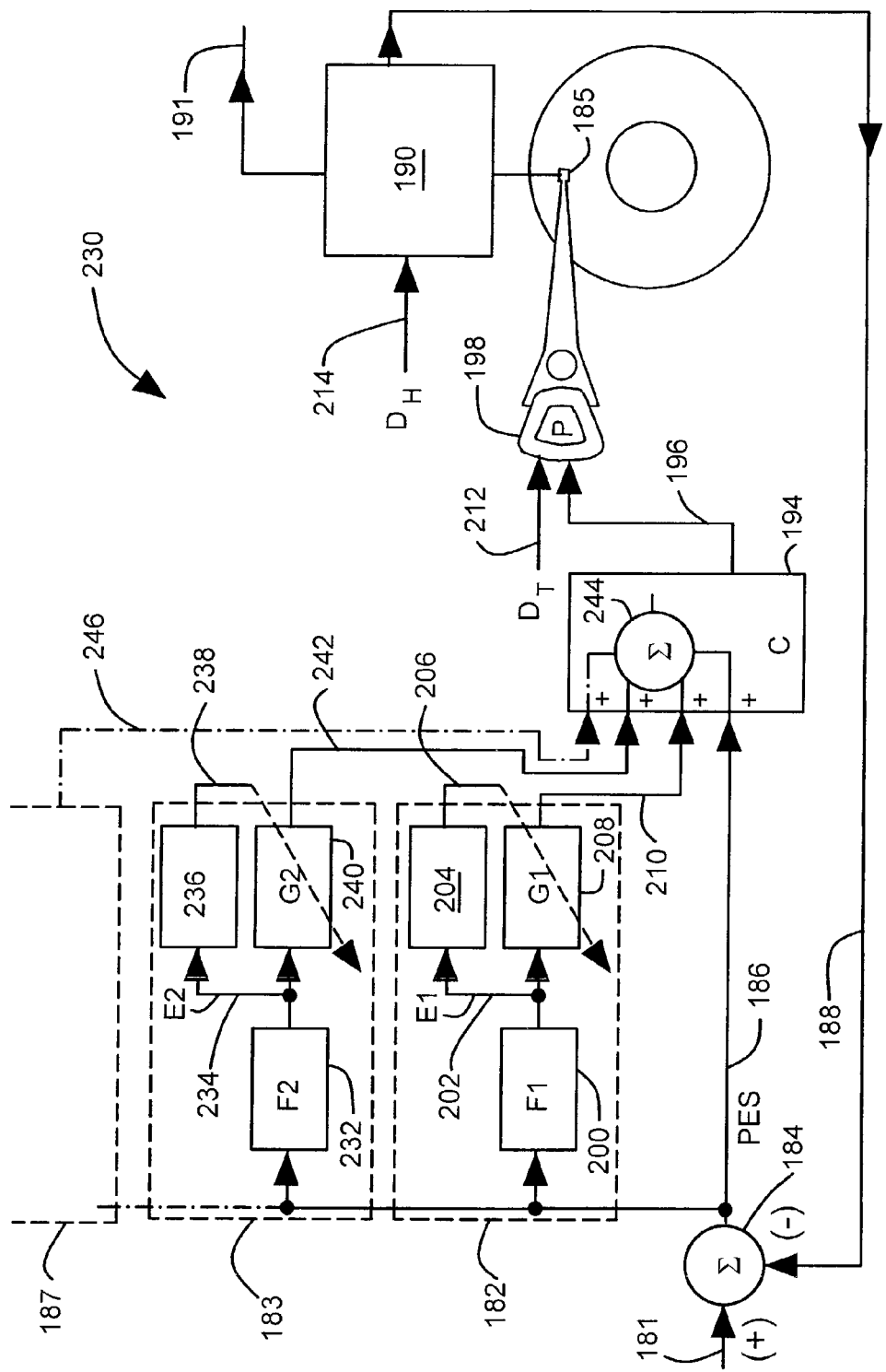
FIG. 4 schematically illustrates a fifth embodiment of a disc drive circuit that includes multiple NRRO compensation circuits.

FIG. 4 schematically illustrates a fifth embodiment of a disc drive circuit 230 that includes multiple self-tuning NRRO compensation circuits 182, 183, 187. In FIG. 4, reference numbers that are the same as reference numbers used in FIG. 3 identify the same or similar features. In FIG. 4, a second self-tuning NRRO compensation circuit 183 is provided. The second self-tuning NRRO compensation circuit 183 has a pass band that is different than the pass band of the first self-tuning NRRO compensation circuit 182, but is otherwise similar in construction to the first NRRO compensation circuit 182.

The second NRRO compensation circuit 183 includes a second bandpass filter 232 that receives the position error signal 186 and that provides a second filter output E2 at 234 that selectively reproduces a second portion of the position error signal 186 in a second preselected frequency band that corresponds with a second NRRO frequency peak that is different than the first NRRO frequency peak. A second amplitude sensing circuit 236 receives the second filter output 234 and provides a second gain control output 238. A second gain control circuit 240 receives the second filter output 234 and receives the second gain control output 238. The second gain control circuit 240 provides a second NRRO compensator output 242 to the controller 194. The second NRRO compensator output 242 reproduces the second filter output 234 multiplied by the second gain control output 238.

In FIG. 4, the controller 194 controls the head position control output 196 as a function of a sum of the position error signal 186 and the first NRRO compensator output 210 and the second NRRO compensator output 242. A summing node 244 in the controller 194 sums, or adds, the inputs from the position error signal 186, the first and second NRRO compensator outputs 210, 242 and also additional NRRO compensator outputs 246 from additional NRRO compensator circuits 187 that differ from first and second NRRO compensator circuits 182, 183 by the frequency of the pass bands.

Figure 5:
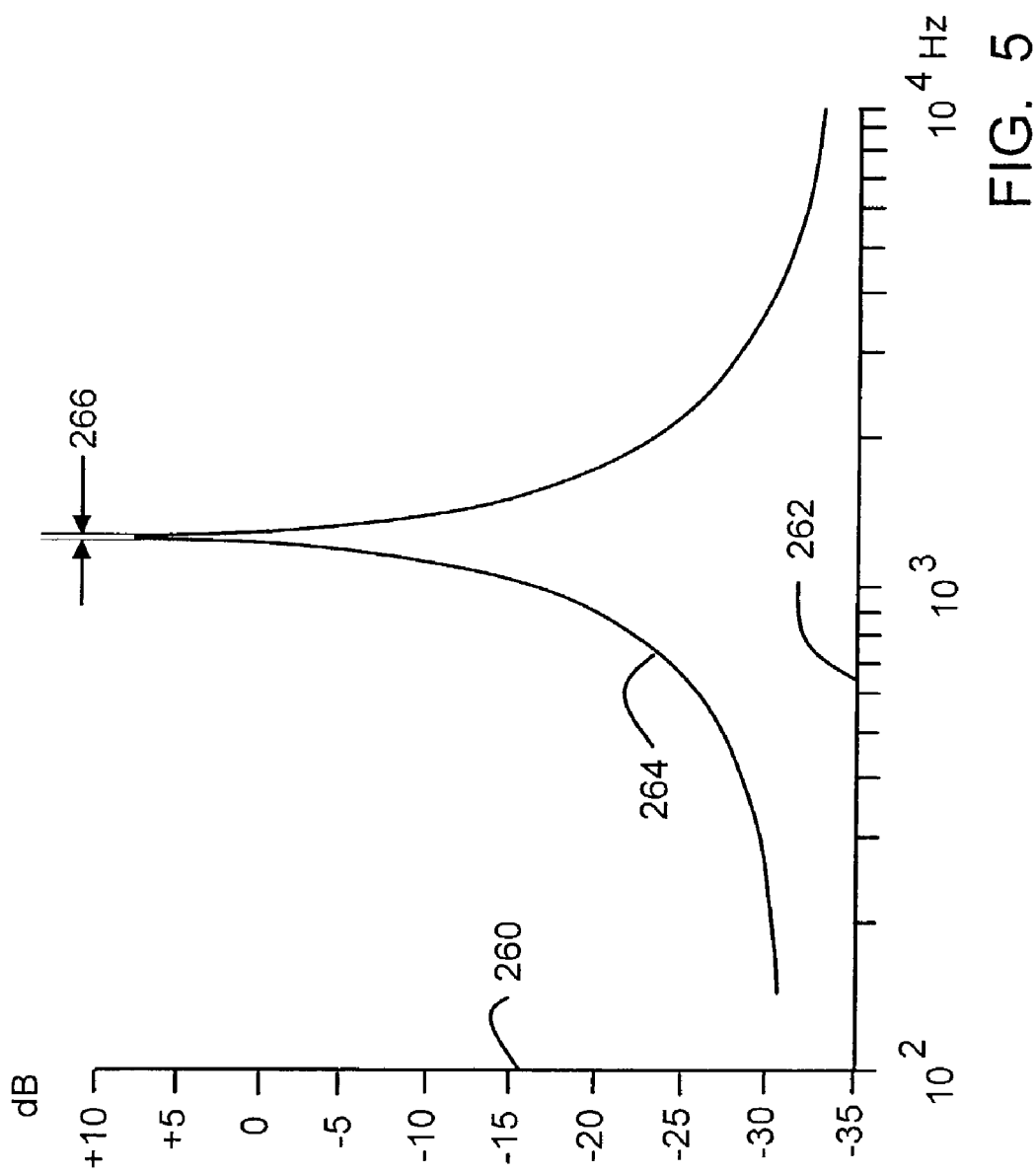
FIG. 5 illustrates a response shape of a bandpass filter.

FIG. 5 illustrates a response shape of a bandpass filter that can be used as one of the bandpass filters 182, 183 or 187 discussed above in connection with FIGS. 3–4. In FIG. 5, a vertical axis 260 represents the gain of the bandpass filter in decibels and a horizontal axis 262 represents frequency in Hertz on a logarithmic scale. For implementation simplicity, a second-order filter with a frequency response shape shown at 264 in FIG. 5 is sufficient for the NRRO detection. Depending on the nature of the NRRO distribution that requires compensation, the 3 dB pass band 266 of the bandpass filter F can be chosen narrower or wider. If the energy of NRRO is located within very narrow frequency range, e.g. the NRRO caused by suspension resonance mode or disc flutters, a bandpass filter (NRRO detector) may be chosen with a 50–100 Hz width 3 dB pass band.

In general, the sensitivity function of a closed-loop servo system gives a measure of how much attenuation the servo system provides at certain frequency to reject the external disturbances. The NRRO compensator design re-shapes the servo loop such that more attenuation is placed at the frequency where more NRRO disturbances are located, when NRRO disturbances are actually present. The NRRO compensation is dynamic and applied at times when it is actually useful, and in proportion to the amount of NRRO actually detected.

In order to generate a notch-like shape in the sensitivity function at a low frequency (below gain cross frequency), a high loop gain is used in the servo open loop. For example, in a sample drive, the gain cross frequency is about 1900 Hz. The following filter F(z) can be used to design a NRRO compensator at 1280 Hz, $$F(z) = \frac{(0.5797z^2 + 0.9828z + 0.3833)^* 10^{-2}}{z^2 - 1.967z + 0.9954} \quad \text{Equation 3}$$

To generate a notch-like shape in the sensitivity function at a high frequency (between gain-cross frequency and phase-cross frequency), a high phase margin is desirable at the compensation frequency of the servo open loop. In another sample drive, the phase cross frequency is about 4000 Hz, to design a NRRO compensator at 2000 Hz, the following filter can be used $$F(z) = \frac{(0.2735z^2 + 0.5829z + 0.2962)^* 10^{-2}}{z^2 - 1.929z + 0.9973} \quad \text{Equation 4}$$

Figure 6:
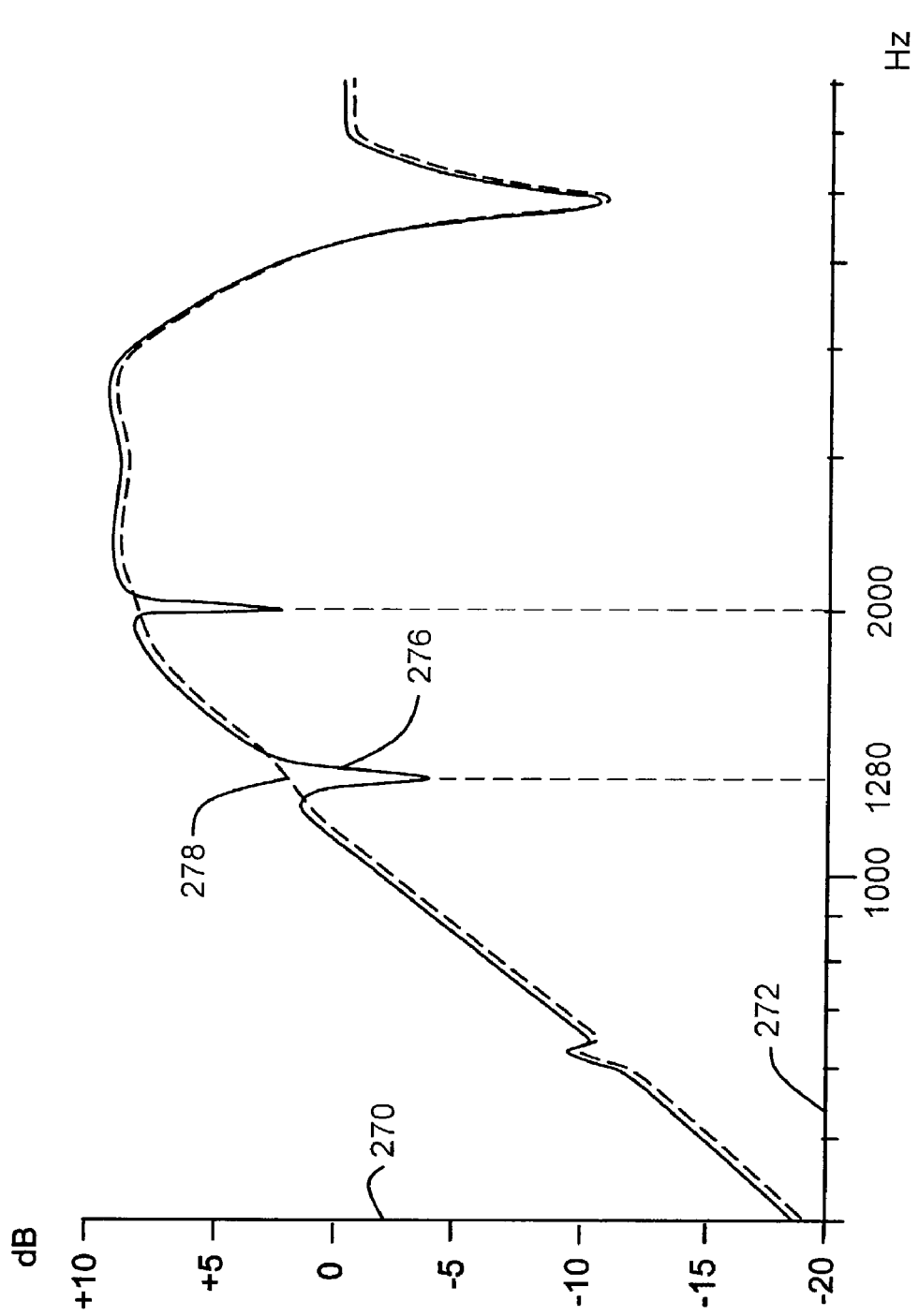
FIG. 6 schematically illustrates a sensitivity function of a disc drive circuit with and without multiple bandpass filters.

FIG. 6 schematically illustrates a sensitivity function of a disc drive circuit with and without multiple bandpass filters. In FIG. 6, a vertical axis 270 represents the sensitivity function in decibels, and a horizontal axis 272 represents the frequency in Hertz on a logarithmic scale. A sensitivity function is a ratio of the incremental change in system response of the servo system to an incremental change in system noise and disturbances over a range of operating frequencies. A solid line 276 represents a sensitivity function of a servo system when two NRRO compensation circuits at 1280 Hz and 2000 HZ are both active due to NRRO noise. A dashed line 278 represents the sensitivity function of the same servo system when the NRRO circuits are inactive because there is no NRRO noise.

It can be seen from FIG. 6 that two NRRO compensators enhance the attenuation capability of servo system at frequency 1280 Hz and 2000 Hz. As the compensator gain g(t) is adjusted through a self-tuning algorithm (such as Eq. 1), the depth of the notch-like shape in FIG. 6 is changed in real-time to reduce the amplification of the PES in other frequencies when there is little NRRO located at 1280 Hz and 2000 Hz.

Figure 7:
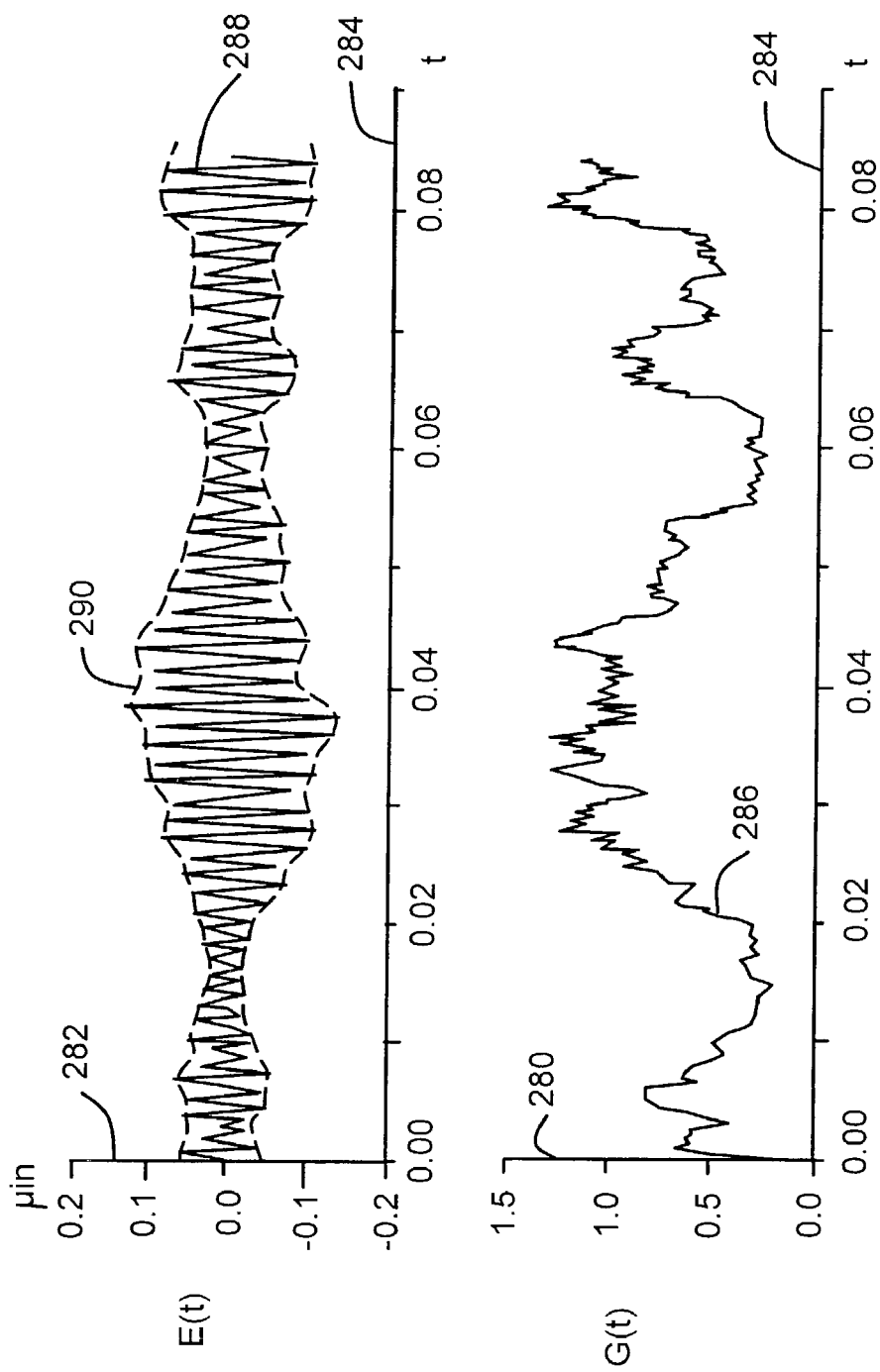
FIG. 7 schematically illustrates a timing diagram showing the gain G(t) and the filtered signal E(t) as functions of time.

FIG. 7 schematically illustrates a timing diagram showing the gain G(t) at 286 and the filter output E(t) at 288 as functions of time t at 284. E(t) is expressed in equivalent microinches (μin) of displacement of the read/write head on a vertical axis 282. G(t) is expressed as a dimensionless ratio on a vertical axis 280. The filter output 288 has an amplitude envelope 290 (dashed lines) with an envelope time constant, and the first gain control output (206 in FIGS. 3–4) has a tuning time constant that is faster than the envelope time constant. It can be seen in FIG. 7 that variations in the envelope 290 are slow relative to variations in the gain 286. This different in time constants allows the control of the gain G(t) to keep up with the bandpass filter in real time.

In the example illustrated in FIG. 7, four compensators have been used to cancel the NRRO at 970 Hz, 1280 Hz, 1785 Hz and 2000 Hz. FIG. 7 shows the filtered signal E(t)=PES*F(z) of the 970 Hz NRRO compensator. It can be seen that the NRRO amplitude detected by filter F(z) at 970 Hz frequency is time varying. An interesting characteristic of this NRRO signal is that the changing rate of the NRRO amplitude envelope 290 is slow. This property enables the self-tuning algorithm to sense and adjust the compensation in real time. In this example, the initial gain g(0) is chosen as zero. As the signal e increases, the gain g(t) increases quickly to add in the NRRO control action. From the time 15 ms the 970 Hz NRRO becomes small, and the control gain g(t) reduces rapidly. From time 25 ms–50 ms, the gain goes up again to attenuate the NRRO at this frequency.

Figure 8:
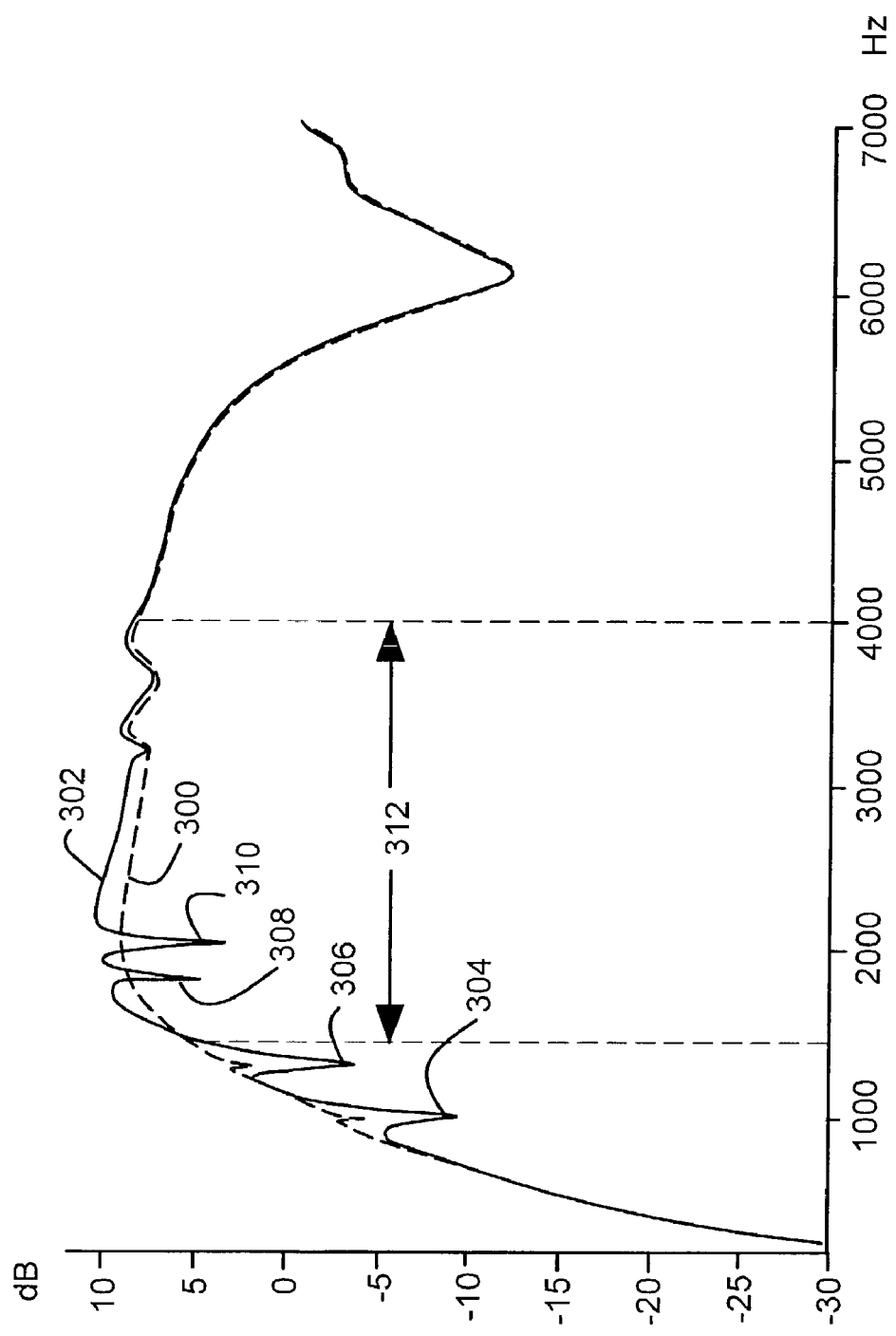
FIG. 8 schematically illustrates a sensitivity function of a disc drive circuit with multiple bandpass filters.

FIG. 8 schematically illustrates a sensitivity function of a disc drive circuit with four bandpass filters. FIG. 8 plots a sensitivity function measured in a sample disc drive for the cases of no NRRO compensation (dashed line 300) and with the self-tuning NRRO compensation (solid line 302). The four notch-like shapes 304, 306, 308, 310 can be seen on the closed-loop response at the desired frequency ranges, which provides 6–10 dB attenuation. The amplitude of sensitivity function 302 increases 1–2 dB at other frequencies 312 from 1.5 Khz to 4 Khz due to the water-bed phenomenon. The "water-bed" phenomena occurs when a control system that has already been optimized over a wide frequency range is modified to perform better in a narrow frequency range. The modification has the effect of improving performance in the narrow frequency range, but in so doing, deteriorates performance over a wider frequency range. The present arrangement evades the water-bed phenomena because the performance improvement in the narrow frequency range is not active except at times it is actually useful due to NRRO.

Figure 9:
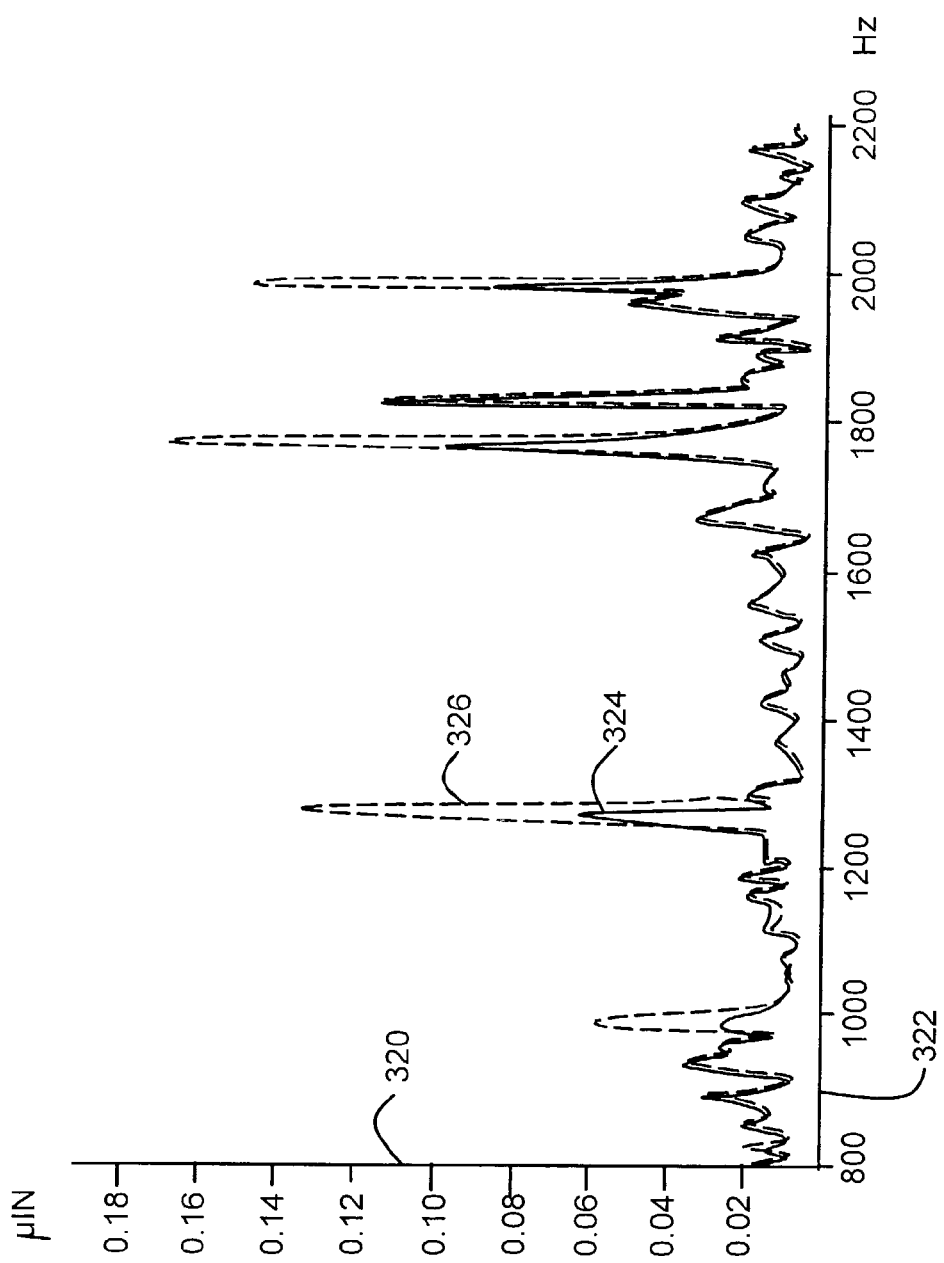
FIG. 9 schematically illustrates the frequency-domain PES with and without multiple bandpass filters.

FIG. 9 schematically illustrates a position error signal as a function of frequency, with (solid line 324) and without (dashed line 326) multiple bandpass filters. In FIG. 9, a vertical axis 320 represents the position error signal (expressed in equivalent microinches of read/write head displacement), and a horizontal axis 322 represents frequency in Hertz.

Since the NRRO at the selected frequencies are much larger than other frequency, attenuating the NRRO at these frequencies results in an overall tracking performance improvement. The key to the success of this self-tuning technique is to place the compensator at the frequency where large NRRO may happen.

Figure 10:
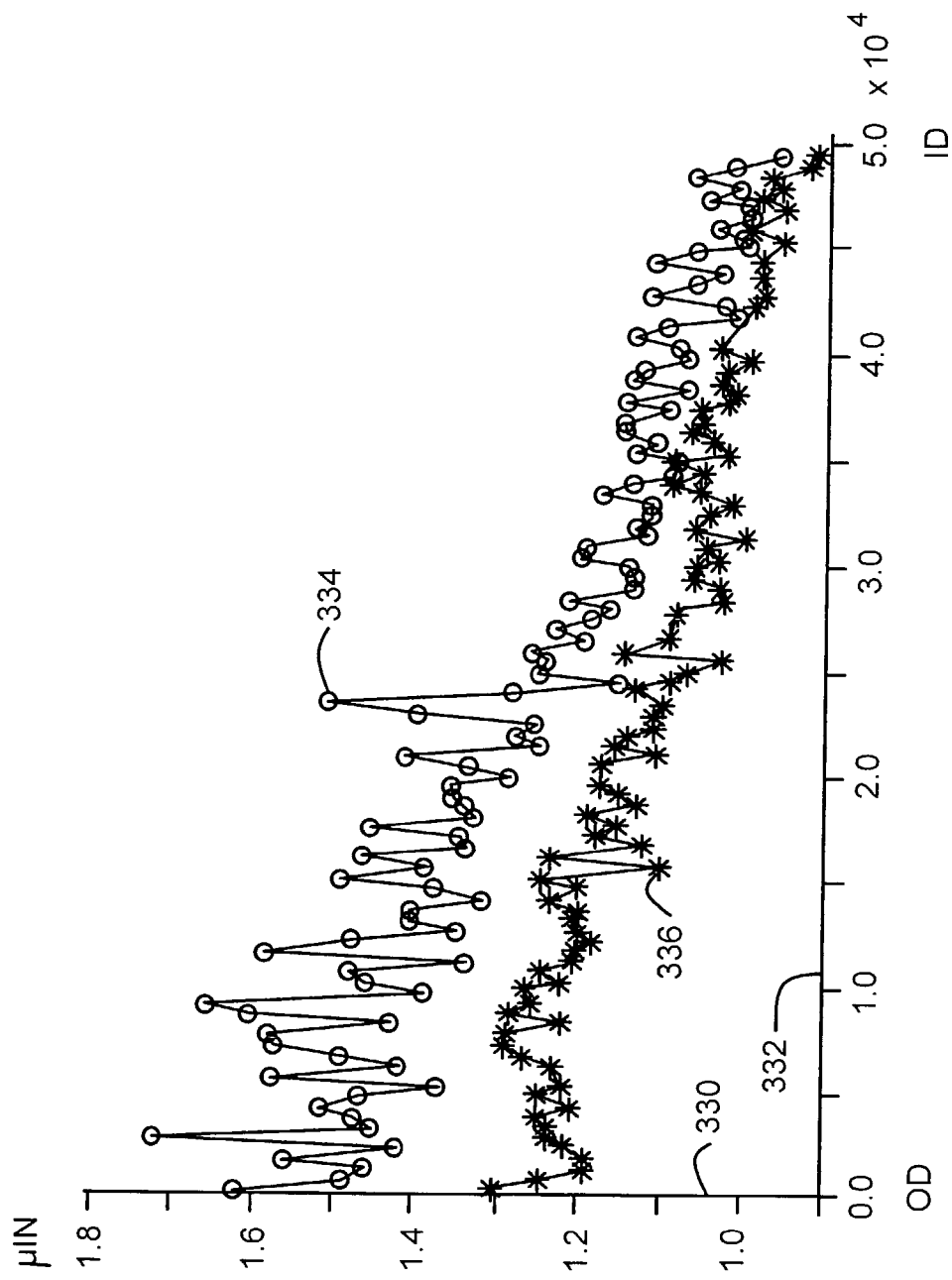
FIG. 10 schematically illustrates variation of runout from inside to outside diameter tracks using circuits with and without multiple bandpass filters.

FIG. 10 schematically illustrates variation of runout, from inside to outside diameter tracks, using circuits with and without multiple bandpass filters. In FIG. 10 a vertical axis 330 represents runout in microinches, and a horizontal axis 332 represents track number ranging from a track number 50,000 at an insider diameter (ID) to a track number 0 at an outside diameter (OD) of a disc. Runout readings marked with small circles 334 are runout readings without use of a NRRO compensation circuit. Runout readings marked with small asterisks 336 are runout readings using a NRRO compensation circuit such as the one illustrated in FIG. 4 with four bandpass filters.

At OD tracks, about 0.3 μinch improvement is achieved. At ID tracks, 0.1 μinch improvement is observed. This difference is due to the fact that the drive has much more NRRO located at outer diameter cylinders than inner diameter cylinders. The average NRRO reduction on this head is about 12.4%.

In summary, an embodiment of a disc drive circuit (such as 180) has a controller (such as 194) that receives a position error signal (such as 186) and that provides a head position control output (such as 196). A bandpass filter (such as 200) also receives the position error signal and provides a filter output (such as 202) that selectively reproduces a portion of the position error signal in a preselected frequency band that corresponds with a NRRO frequency peak. An amplitude sensing circuit (such as 204) receives the filter output and provides a gain control output (such as 206). A gain control circuit (such as 208) receives the filter output and the gain control output. The gain control circuit provides a NRRO compensator output (such as 210) to the controller. The NRRO compensator output reproduces the filter output multiplied by a gain G set by the gain control output.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the non-repeatable run out compensation while maintaining substantially the same functionality without departing from the scope and spirit of the present invention. In addition, although preferred embodiments described herein are directed to a disc drive with a thin film read/write head, it will be appreciated by those skilled in the art that the teachings of the present invention can be applied to other types of storage devices with non-repeatable runout, without departing from the scope of the present invention.

What is claimed is:

1. A circuit controlling a head position in an apparatus comprising:
    a runout input that includes a characteristic of non-repeatable runout (NRRO); and
    a first frequency circuit receiving the runout input and providing a first frequency indicating output corresponding to NRRO noise;
    a first characteristic sensing circuit sensing the first frequency-indicating output and including a noise threshold level, the first characteristic sensing circuit generating a first control output that adjusts a first NRRO compensation gain when the NRRO noise is above the noise threshold level; and
    a first control circuit receiving the first control output and providing a first NRRO compensator output.

2. The circuit of claim 1 wherein:
    the first frequency circuit comprises a first bandpass filter receiving a position error signal (PES) and providing a first filter output in a first preselected frequency band;
    the first characteristic sensing circuit comprises a first gain control circuit having a first NRRO compensation gain, the first gain control circuit receiving the first filter output and providing a first NRRO compensator output to a controller; and
    the first control circuit comprises a first amplitude sensing circuit sensing the first filter output and generating a first gain control output that adjusts the first NRRO compensation gain.

3. The circuit of claim 2 wherein the first amplitude sensing circuit automatically tunes the first gain control output to increase the first NRRO compensation gain when the first filter output increases, and to decrease the first NRRO compensation gain when the first filter output decreases, and wherein the controller sums the position error signal and the first NRRO compensator output such that the NRRO is attenuated in the first preselected frequency band at a head position control output of the controller.

4. The circuit of claim 2 wherein the first filter output has an amplitude envelope with an envelope time constant, and the first gain control output has a tuning time constant that is faster than the envelope time constant.

5. The circuit of claim 2 wherein the first amplitude sensing circuit includes a recursive algorithm that tunes the first gain control output in real time.

6. The circuit of claim 5 wherein the recursive algorithm is a function of $$g(t) = \begin{cases} \alpha^* g(t-1) + \beta^*(|e| - e_0), & \text{when } |e| > e_0 \\ \alpha^* g(t-1), & \text{when } |e| \le e_0 \end{cases}$$

where t is a number of a time increment, g is the first gain, α has a value between 0 and 1, β is a tuning rate greater than 0, e is the first filter output and $e_0$ is a selected level of e for turning the automatic tuning on and off.

7. The circuit of claim 6 wherein the recursive algorithm has an initial condition value g(0) at the start of a seek operation, and the initial condition value g(0) is adjusted as a function of track number.

8. The circuit of claim 2 wherein the first bandpass filter comprises a second order filter.

9. The circuit of claim 2 wherein the controller controls the head position control output as a function of a sum of the position error signal and the first NRRO compensator output.

10. The circuit of claim 2 further comprising:
a second bandpass filter receiving the position error signal (PES) and providing a second filter output in a second preselected frequency band;
a second gain control circuit having a second NRRO compensation gain, the second gain control circuit receiving the second filter output and providing a second NRRO compensator output to the controller;
a second amplitude sensing circuit sensing the second filter output and generating a second gain control output that adjusts the second NRRO compensation gain; and
the controller summing the second NRRO compensator output with position error signal and the first NRRO compensator output.

11. The circuit of claim 10 wherein the controller controls the head position control output as a function of a sum of the position error signal and the first NRRO compensator output and the second NRRO compensator output.

12. The circuit of claim 10 further comprising:
a third bandpass filter receiving the position error signal (PES) and providing a third filter output in a third preselected frequency band;
a third gain control circuit having a third NRRO compensation gain, the third gain control circuit receiving the third filter output and providing a third NRRO compensator output to the controller;
a third amplitude sensing circuit sensing the third filter output and generating a third gain control output that adjusts the third NRRO compensation gain; and
the controller summing the third NRRO compensator output with position error signal and the first and second NRRO compensator output.

13. The circuit of claim 12 wherein the controller controls the head position control output as a function of a sum of the position error signal and the first NRRO compensator output and the second NRRO compensator output and the third NRRO compensator output.

14. A method for compensating for non-repeatable runout error (NRRO) noise in a head position, the method comprising:
filtering to provide a first output in a first preselected frequency band;
providing a first NRRO compensation output as a function of the first output and a first NRRO compensation gain; and
sensing the first output to generate a first control output adjusting the first NRRO compensation gain when the NRRO noise is above a noise threshold level.

15. The method of claim 14 further comprising:
summing a position error signal and the first NRRO compensator output in a controller such that the NRRO is attenuated in the first preselected frequency band; and
wherein the first preselected frequency band corresponds with a first NRRO frequency peak.

16. The method of claim 14 further comprising generating a head position control output in the controller to control the head position.

17. The method of claim 14 further comprising: automatically tuning the first control output to increase when the first output increases, and to decrease when the first output decreases.

18. The method of claim 17 further comprising: providing the automatic tuning with a tuning time constant that is faster than an envelope time constant of an amplitude envelope of the first output.

19. The method of claim 17 further comprising: performing the automatic tuning in real time with a recursive algorithm.

20. The method of claim 19 further comprising: generating the first control output as a function of:

$$g(t) = \begin{cases} \alpha^* g(t-1) + \beta^*(|e| - e_0), & \text{when } |e| > e_0 \\ \alpha^* g(t-1), & \text{when } |e| \leq e_0 \end{cases}$$

where t is time, g is the first gain, $\alpha$ has a value between 0 and 1, $\beta$ is a tuning rate greater than 0, e is the first output and $e_0$ is a selected level of e for turning the automatic tuning on and off.

21. The method of claim 14, further comprising:
filtering a position error signal (PES) to provide a second output in a second preselected frequency band;
amplifying the second output by a second NRRO compensation gain to provide a second NRRO compensator output to the controller;
sensing the second output to generate a second control output adjusting the second NRRO compensation gain; and
summing the second NRRO compensator output with the position error signal and the first NRRO compensator output in the controller such that the NRRO is attenuated in the second preselected frequency band.

22. The method of claim 21 further comprising: generating a head position output in the controller to control the head position.

23. The method of claim 21, further comprising:
filtering the position error signal (PES) to provide a third output in a third preselected frequency band;
amplifying the third output by a third NRRO compensation gain to provide a third NRRO compensator output to the controller;
sensing the third output to generate a third control output adjusting the third NRRO compensation gain; and
summing the third NRRO compensator output with the position error signal and the first and second NRRO compensator outputs in the controller such that the NRRO is attenuated in the second preselected frequency band.

24. The method of claim 23 further comprising:
generating a head position output in the controller to control the head position.

25. A circuit controlling an apparatus position, comprising:
a summing junction providing a position error signal;
a controller receiving the position error signal and providing an apparatus position control output; and
compensator means for providing a NRRO compensation output having a first NRRO compensation gain adjusted when NRRO noise is above a noise threshold level, the compensator means providing the NRRO compensation output to the controller in a first preselected frequency band that corresponds with a first NRRO frequency peak.

26. The circuit of claim 25 wherein the compensator means include a recursive algorithm that tunes the first gain control output in real time.

27. The circuit of claim 26 wherein the recursive algorithm is a function of $$g(t) = \begin{cases} \alpha^* g(t-1) + \beta^*(|e| - e_0), & \text{when } |e| > e_0 \\ \alpha^* g(t-1), & \text{when } |e| \leq e_0 \end{cases}$$

where t is a number of a time increment, g is the first gain, $\alpha$ has a value between 0 and 1, $\beta$ is a tuning rate greater than 0, e is the first filter output and $e_0$ is a selected level of e for turning the automatic tuning on and off.

28. The circuit of claim 27 wherein the recursive algorithm has an initial condition value g(0) at the start of a seek operation, and the initial condition value g(0) is adjusted as a function of track number.

* * * * *